United States Patent Office 3,254,842
Patented June 7, 1966

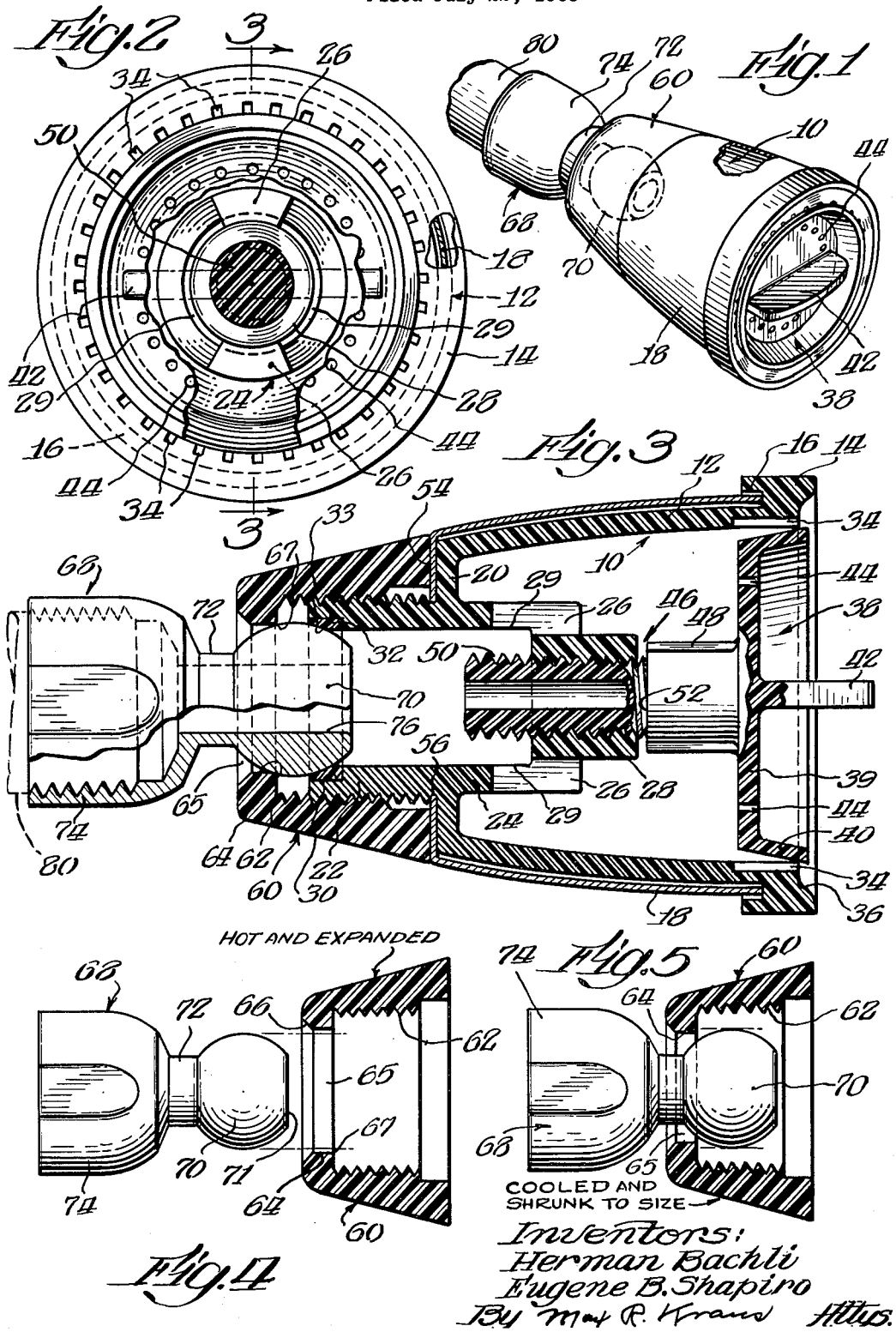
June 7, 1966     H. BACHLI ETAL     3,254,842
SHOWER HEAD
Filed July 22, 1963
Inventors:
Herman Bachli
Eugene B. Shapiro

3,254,842
SHOWER HEAD
Herman Bachli, Chicago, and Eugene B. Shapiro, Skokie, Ill., assignors to Chicago Specialty Manufacturing Co., Skokie, Ill., a corporation of Illinois
Filed July 22, 1963, Ser. No. 296,656
5 Claims. (Cl. 239—107)

This invention relates to improvements in a shower head.

One of the objects of this invention is to provide an improved shower head which may be readily and easily cleansed of sediment or other foreign matter found in water which normally lodges in the shower head.

Another object of this invention is to provide a shower head which may utilize a connector member formed of a single piece which is insertable into a plastic molded coupling nut immediately subsequent to the molding of the coupling nut while it is still hot so that when the coupling nut sets and contracts it forms a permanent connection with the connector member. This eliminates the expense of forming connector members of two sections for the purpose of connecting same to the coupling nut and thereby reduces the cost of manufacture and assembly of the unit.

Another object of this invention is to provide a structure which may be made of relatively few parts, which utilizes certain parts, for example, the body, coupling nut, and shower face formed of a molded plastic material and relatively inexpensive to manufacture, which is attractive in appearance and which is economical to produce and highly effective in operation.

Other objects will become apparent as this description progresses.

In the drawings:

FIG. 1 is a perspective view of the shower head forming this invention.

FIG. 2 is a plan view from the outlet end partially broken away.

FIG. 3 is an enlarged sectional view taken on lines 3—3 of FIG. 2.

FIG. 4 is an exploded view of the connector and the coupling nut prior to connecting same, and FIG. 5 is a view of the connector and coupling nut connected.

The shower head has a body generally indicated at 10 which comprises a main shell-like cylindrical body portion 12 having a gradual inwardly extending taper from the front portion to the rear. The front portion of the body has an enlarged annular surface 14, the rear of which is provided with an annular groove 16 for receiving the outer end of a metal shell 18 which is positioned around the body 12, as will be described.

The body 10 has a rear wall 20 with a rearwardly extending externally threaded tubular portion 22. Extending inwardly of the end wall 20 is an annular bossing 24 from which extends inwardly a pair of diametrically oppositely spaced supporting members 26 which are bridged by an internally threaded sleeve 28 which projects forwardly of the upper end of the supporting members 26. The sleeve 28 is coaxial with the tubular portion 22. Open spaces or passageways 29 are provided between the supporting members 26 and between the end wall 20 and the threaded sleeve 28 so that water entering through the tubular portion 22 passes into the interior of the body 10 through the openings 29. The rear end of the tubular portion 22 has a recess 30 to receive a nylon ring 32 having a tapered surface 33.

The mouth or front of the body 10 is provided with longitudinally extending spaced grooves 34 which form passageways for the discharge of the water from the shower head. The annular surface 14 extends forwardly of the spaced grooves 34. A tapered shoulder 36 extends forwardly of the grooves. The body just described may be integrally molded of a plastic material, preferably nylon.

The shower face generally indicated at 38 comprises a disc member 39 having an annular upstanding wall or flange 40 which is tapered, as best seen in FIG. 3, for cooperation with inside wall surface of the body 10 adjacent the spaced grooves 34. An integrally formed rib 42 extends diametrically across the top of the disc for manual engagement for rotating the disc. The disc has a plurality of spaced openings 44 therein.

Formed integrally with the disc 39 is a rearwardly extending stem 46 which is provided with an enlarged portion 48 and a reduced externally threaded portion 50, providing a shoulder 52 therebetween. The threaded stem portion 50 is received in the threaded sleeve 28, as shown in FIG. 3, and supports the shower face. The shoulder 52 engages the outer surface of the sleeve 28 and serves to limit or stop the inward rotation of the shower face 38. Thus, the shower face cannot be rotated or adjusted inwardly to a greater extent than that necessary, and the tapered wall 40 of the shower face 38 will not be wedged against the grooved wall surface 34 as might occur if the inward rotation of the shower head were not circumscribed by the shoulder 52, with the shoulder 52 thus limiting the inward adjustment of the shower head; wedging of the shower face against the mouth of body 10 is eliminated. The shower face is molded of plastic material, preferably nylon.

The metal shell 18 has an end wall 54 provided with a central enlarged opening 56 and a communicating cutout. The shell is positioned on the body and is held in position by a coupling nut generally indicated at 60. The coupling nut is molded of plastic, preferably a nylon material. The coupling nut is internally threaded as at 62 to engage the threads on tubular member 22. The nut is also provided with an annular surface 64 of reduced internal diameter adjacent the rear end thereof to provide an opening 65. The rear of the annular surface 64 has a chamfered surface 66 which forms the entrance for insertion of the ball-shaped end member of the connector member, presently to be described. The annular surface 66 has an inside sharp edge 67 which engages the ball member and prevents its withdrawal. The exterior of the nut is tapered.

A connector member generally indicated at 68 is permanently connected to the coupling nut 70, as will be described. The connector is formed preferably of metal and is integrally formed to provide a ball-shaped end member 70, a reduced intermediate neck 72, and an enlarged sleeve portion 74 which is internally threaded. The front end of the ball member is flat as at 71. The ball member 70 has a central bore 76 communicating through the neck 72 with the sleeve 74. The sleeve 74 is adapted to be threaded into engagement with the threaded end of the nipple 80 of a water outlet, which is well known in the art.

Permanently connecting the one-piece connector 68 to the coupling nut 60 forms part of this invention. In prior art structures a connector was made in two sections, that is, the ball end member and the neck portion comprised with the sleeve, which had a larger diameter and which one section, and after it was inserted into the nut through the forward end it was secured in threaded engagement could not be inserted through the reduced opening at the rear end of the nut. With the present invention this is all eliminated and the connector is formed of integral structure.

The ball member 70 is inserted into the rear or reduced opening 65 of the coupling nut 60, as shown in FIG. 4, immediately after the coupling nut is ejected from the injection molding machine, while the coupling nut is still hot and in its expanded condition. In this condition of the coupling nut the ball member is inserted through the reduced opening 65 into the coupling nut. The ball-shaped surface of member 70 first engages the chamfered surface 66 of the coupling nut 60 which allows it to enter the still pliable coupling nut and pass completely through the opening 65. As the coupling nut cools and sets it contracts sufficiently to form a permanent connection with the connector, as shown in FIG. 5, where it is irremovable therefrom. The inside sharp edge 67 engages the ball member 70 and prevents withdrawal of the ball member from the coupling nut. When the coupling nut is secured to the threaded portion 22 of the body, as in FIG. 3, it connects the connector to the body.

The water from the water source will pass through the nipple 80, through the sleeve 74, neck 72, ball member 70, through tubular portion 22 of the body, into the interior of body 10, through openings 29, and through the spaced grooves 34. Some water will also pass through openings 44. Adjusting the shower face 38 relative to the spaced grooves 34 will change the character of the stream. When the shower face is positioned all the way in, that is, when the tapered wall 40 is against the inner wall of the grooved surface, a full spray is produced. As the shower face is moved partially outwardly the spray stream widens. Moving it further outwardly will produce a rinse spray. Moving the shower face all the way out permits the grooves 34 to be cleansed of sediment or sand or other impurties which would normally lodge in the grooves.

When the shower face 38 is adjusted outwardly away from the grooves 34, a pin, hairpin, or the like, is readily insertable into the grooves to clean out the sediment, lime, sand or other foreign matter found in water which would normally lodge in the grooves and block them. If the grooves are filled with foreign matter and water cannot pass through then the spray effect of the shower is lost. Hence, with this invention the grooves may be kept free and clear at all times. The shower face is readily adjustable by rotation and removable with respect to the body, and any desired spray may be obtained.

It will be understood that various changes and modifications may be made from the foregoing without departing from the spirit and scope of the appended claims.

What is claimed is:

1. A shower head including a body and a separate coupling nut means, said coupling nut means formed of a molded plastic material and having a reduced opening at the entrance end thereof, said body having a plurality of spaced longitudinally extending grooves adjacent the outlet end, a shower face rotatably connected to said body for adjustment of said shower face relative to said grooves, means on said coupling nut means at its opposite end for securing said coupling nut means to said body, a rigid connector formed of a single piece of rigid material having a rigid ball-shaped member at one end and rigid connector means at its opposite end with the rigid ball-shaped member and the rigid connector means each of a greater diameter than the reduced opening of the coupling nut means, with the coupling nut means so constructed that it will receive the larger ball-shaped member through its said reduced opening when inserted through the entrance end and will permanently couple the connector to said coupling nut means without the use of any additional coupling retaining means.

2. A structure defined in claim 1 in which the body is provided with an annular groove adjacent one end, and a metal shell surrounds said body and is received in said annular groove, said shell having its opposite end turned inwardly and in engagement with said coupling nut.

3. A structure defined in claim 1 in which the body is formed with an integrally rearwardly extending externally threaded tubular portion to which the coupling nut means is secured, said body also having an integrally formed annular bossing from which extends inwardly a pair of diametrically oppositely spaced supporting members which are bridged by an internally threaded sleeve, with the shower face having a threaded stem engaging said sleeve.

4. A structure defined in claim 2 in which the body is formed with an integrally rearwardly extending externally threaded tubular portion to which the coupling nut means is secured, said body also having an integrally formed annular bossing from which extends inwardly a pair of diametrically oppositely spaced supporting members which are bridged by an internally threaded sleeve, with the shower face having a threaded stem engaging said sleeve.

5. A shower head including a body and a separate coupling nut means, said coupling nut means formed of a molded plastic material and having a reduced opening at the entrance end thereof, said body having a plurality of spaced longitudinally extending grooves adjacent the outlet end, means on said coupling nut means at its opposite end for securing said coupling nut means to said body, a connector formed of a single piece of rigid material having a rigid ball-shaped member at one end and rigid connector means at its opposite end with the ball-shaped member inserted through the reduced opening of said coupling nut means and permanently connected thereto without the use of any additional coupling retaining means, said body formed with an integrally rearwardly extending externally threaded tubular portion which is connected to the coupling nut means, said body having an integrally formed annular bossing internally thereof from which extends inwardly a pair of diametrically oppositely spaced supporting members which are bridged by an internally threaded sleeve, with the shower face having a threaded stem engaging said sleeve, a shower face rotatably connected to said body for adjustment of said shower face relative to the grooves on said body, said body having an annular groove adjacent one end and a metal shell surrounding said body and secured in said annular groove, said shell having its opposite end turned inwardly and in engagement with said coupling nut means.

References Cited by the Examiner

UNITED STATES PATENTS

| | | | |
|---|---|---|---|
| 2,012,623 | 8/1935 | Boyd | 239—460 |
| 2,044,445 | 6/1936 | Price et al. | 239—460 |
| 2,049,141 | 7/1936 | Schneider | 239—451 |
| 2,423,960 | 7/1947 | Bucknell et al. | 239—456 |
| 2,424,409 | 7/1947 | Meyer | 285—261 |
| 2,717,792 | 9/1955 | Pelley | 285—261 |
| 2,756,108 | 7/1956 | Warren | 239—457 |
| 2,990,122 | 6/1961 | Blumberg et al. | 239—539 |
| 2,990,123 | 6/1961 | Hyde | 239—107 |

M. HENSON WOOD, JR., *Primary Examiner.*

EVERETT W. KIRBY, *Examiner.*

R. S. STROBEL, *Assistant Examiner.*